United States Patent [19]

Makihata

[11] Patent Number: 5,751,790
[45] Date of Patent: May 12, 1998

[54] VOICE INFORMATION SERVICE DEVICE AND VOICE INFORMATION SERVICE METHOD

[75] Inventor: Kazuhisa Makihata, Tokyo, Japan

[73] Assignee: NEC Corporation, Tokyo, Japan

[21] Appl. No.: 621,204

[22] Filed: Mar. 21, 1996

[30] Foreign Application Priority Data

Mar. 22, 1995 [JP] Japan ..................... 7-062611

[51] Int. Cl.[6] ............................................ H04M 1/64
[52] U.S. Cl. ........................ 379/71; 379/76; 379/77
[58] Field of Search ............................ 379/71, 88, 67, 379/73, 84, 97, 93.26, 76, 77

[56] References Cited

U.S. PATENT DOCUMENTS

| 5,530,950 | 6/1996 | Medan et al. | 379/67 |
|---|---|---|---|
| 5,619,554 | 4/1997 | Hogan et al. | 379/67 |

FOREIGN PATENT DOCUMENTS

| 64-57863 | 3/1989 | Japan . |
|---|---|---|
| 4-318739 | 11/1992 | Japan . |

*Primary Examiner*—Thomas W. Brown
*Attorney, Agent, or Firm*—Sughrue, Mion, Zinn, Macpeak & Seas, PLLC

[57] ABSTRACT

When a request to record is received from an information provider by way of a telephone network, a storage area is secured for each information number of provided information, and index numbers designated by the information provider and voice file numbers designated within the device are recorded to the storage area. The information is then recorded in designated voice files for each arbitrary unit set by the information provider. When a playback request is received from an information user, voice file numbers are read out from the corresponding storage area in the order of the index numbers according to the designation of information numbers from the information user, and the information is played back in the order of the read voice files.

4 Claims, 2 Drawing Sheets

VOICE INFORMATION SERVICE DEVICE AND VOICE INFORMATION SERVICE METHOD

BACKGROUND OF THE INVENTION

1. Field of the Invention

The present invention relates to a voice information service device and voice information service method which allow voice information to be provided from a plurality of information providers by telephone and to be received by a plurality of information users by telephone.

2. Description of the Related Art

In a voice information service device that is connected to a telephone network whereby information is provided as voice from each telephone of a plurality of information providers, the information recorded by information providers by telephone is provided to information users without alteration as one unit of information.

In addition, in a voice information service device which information is managed by a system manager providing an information service, information from an information provider can be collectively managed by the system manager or host computer, as proposed in Japanese Patent Laid-open No. 57863/89 or Japanese Patent Laid-open No. 318739/92. In accordance with instructions from an information provider, the system manager or host computer either assembles sentences that have been divided into arbitrary units, or modifies only parts of sentences to compose new information, and provides the modified information to information users.

Nevertheless, of the above-described voice information service devices of the prior art, in a voice information service device in which information is provided by voice from each telephone of a plurality of information providers, information in which a plurality of sentences are combined could not be provided to information users. In addition, there is the problem that information must all be recorded again in cases in which a portion of information is modified or a sentence is added.

On the other hand, in a voice information service device that is managed by a system manager, the system manager adds and modifies each type of information periodically or modifies and adds collectively, and as a result, information is not immediately updated and information users cannot be promptly provided with the most recent information from an information provider.

SUMMARY OF THE INVENTION

The present invention was created to solve the above-described problems of the prior art and has the object of providing a voice information service device that can easily accommodate even frequent information modifications from an information provider and can promptly provide the most recent information to information users.

To achieve the above-described objects, a voice information service device according to the present invention allows voice information to be provided from a plurality of information providers using telephones, and allows a plurality of information users to receive the provided voice information by telephone, and comprises:

a voice communication controller that performs call acceptance of telephone calls from information providers or information users and analyzes PB (push-button) tones;

a service analyzer that, based on the analysis result of the voice communication controller, decides to record or play back information;

a recording medium made up of a plurality of voice files into which information may be recorded;

a management table in which storage area is secured for every information number assigned in claim 1 to information, and into which, for every information number, a voice file number for identifying the voice file and an index number for designating the order of playback of the voice files are recorded;

a record/playback controller that, when recording information, designates the voice file number, pairs the voice file number with the index number designated by the information provider and records to the storage area, and when playing back information, reads the voice file number in the order of the index numbers from the storage area corresponding to the information number designated by the information user; and a register that, when recording information, records information for every arbitrary unit designated by the information provider to a voice file of voice file number designated by the record/playback controller, and when playing back information, registers and plays back information within voice files in the order of voice file number read by the record/playback controller.

Here, the record/playback controller may return to the information provider the voice file numbers designated when recording the information, and according to instructions from the information provider, pair the index numbers and the voice file numbers and record to the storage area.

In addition, a voice information service method according to the present invention utilizes a recording medium made up of a plurality of voice files into which information is recorded and a management table which secures storage area for every information number conferred to information and, for each of the information numbers, records a voice file number for identifying the voice file and an index number for designating the order of playback of voice files;

allows voice information to be provided from a plurality of information providers using telephones and allows a plurality of information users to receive the provided voice information by telephone; wherein:

call acceptance is performed for telephone calls from information providers or information users and PB tones are analyzed, and, based on the analysis result of the PB tones, judgment is made to record or play back information;

when recording information, a voice file number is designated, and a voice file number and an index number designated by the information provider are paired and recorded to the storage area, and in addition, information is recorded for every arbitrary unit designated by the information provider to a voice file of a designated voice file number;

and when playing back information, the voice file number is read out in the order of the index numbers from the storage area corresponding to the information number designated by the information user; and information within voice files is registered and played back in the order of read voice file numbers.

Here, a voice file number designated when recording information may be returned to an information provider, and according to instructions from the information provider, index numbers and voice file numbers may be paired and recorded to the storage area.

In a voice information service device according to the present invention having the above-described construction, upon receiving a request to record information from an information provider, the record/playback controller secures a storage area in the management table for every information number of the provided information and records to the storage area an index number designated by the information provider and a voice file number designated by the record/playback controller. The register then records information to voice files of voice file number designated by the record/playback controller for every arbitrary unit designated by the information provider.

On the other hand, upon receiving a request from an information user to play back information, the record/playback controller reads out voice file numbers in the order of the index numbers from the corresponding storage areas within the management table for information numbers designated by the information user, and the register plays back information in the order of the voice files read out by the record/playback controller.

Accordingly, information may be recorded or played back for each arbitrary unit, and as a result, information need not be entirely recorded again whenever a portion is altered or information is added.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

An embodiment of the present invention will next be explained with reference to the accompanying figures. This embodiment of the voice information service device allows information providers to provide voice information by telephone and information users to obtain necessary information in voice form by requesting by telephone.

Figure 1:
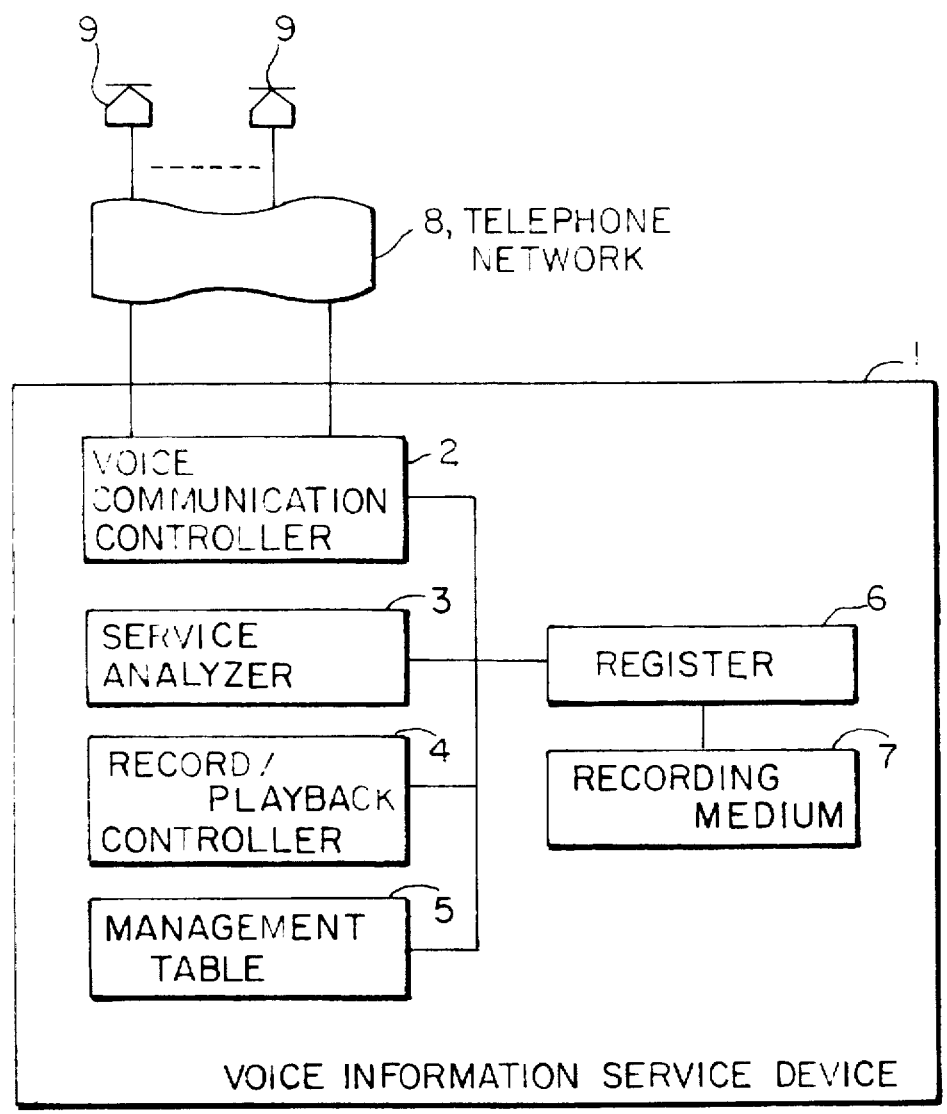
FIG. 1 is a block diagram showing the configuration of a voice information service device according to the present invention.

In FIG. 1, voice information service device 1, which records and plays back information in voice form, is connected to a conventional public telephone network 8 by, for example, transmission circuits, and a plurality of telephones 9 for each user are in turn connected to telephone network 8.

Voice information service device 1 is composed of: voice communication controller 2 which accepts telephone calls from information providers or information users and analyzes PB (push-button) tones; service analyzer 3 which, based on the analysis result of PB tones, judges to record or play back information; record/playback controller 4 which controls recording or playback of information according to the decision results of service analyzer 3; management table 5 which secures a storage area for each unit of provided information and records an index number and voice file number for each unit of information; recording medium 7 made up of a plurality of voice files into which information may be recorded; and register 6 which records information to a voice file and accesses and plays back information from a voice file.

Figure 2:
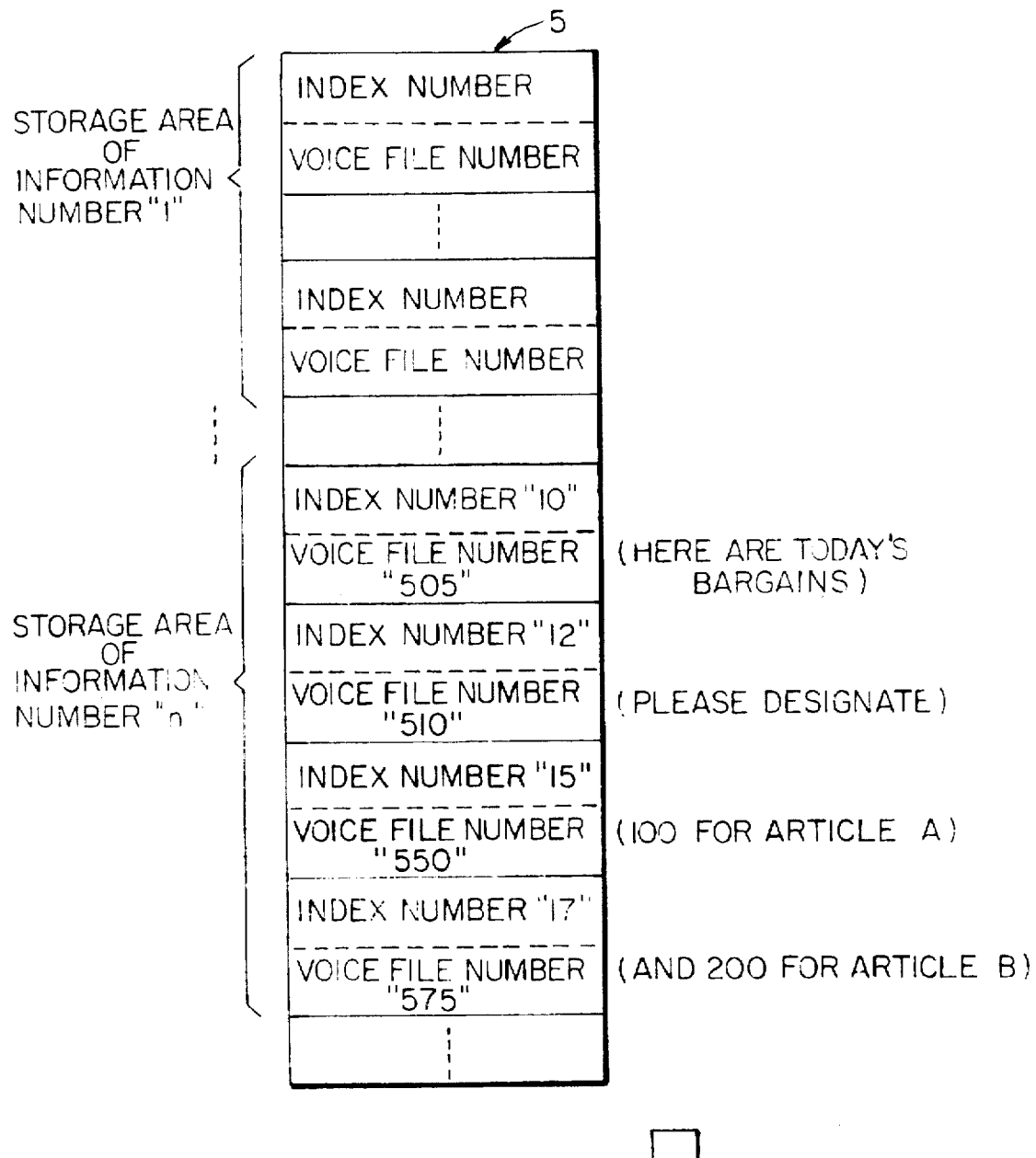
FIG. 2 shows the contents of a management table of the voice information service device shown in FIG. 1.

In FIG. 2, a respective information number is allotted to each unit of information according to the designation of the information provider, and a storage area is secured in management table 5 for each information number. Information is divided into arbitrary units according to designation by the information provider and recorded. An index number for every arbitrary unit of information and a voice file number into which information is recorded are paired and recorded into a storage area of management table 5.

The voice file numbers are, for example, designated by record/playback controller 4 in the order of recording, and the index numbers are numbers assigned in consideration of the order of playback according to designation from the information provider.

Operation of the voice information service device according to this embodiment will next be explained, beginning with operation in the event of a request from an information provider to record information.

When a telephone call is received from an information provider, voice communication controller 2 performs call acceptance, analyzes PB tones from the user's telephone 9, discriminates the number, and passes this number on to service analyzer 3. Service analyzer 3 determines that recording service has been requested based on the number discriminated from the PB tones, and waits for designation of information numbers and index numbers from the information provider.

When the information numbers and index numbers are sent from the information provider by, for example, PB tones, service analyzer 3 passes the numbers on to record/playback controller 4 and instructs recording.

Based on the designated information numbers and index numbers, record/playback controller 4 secures the necessary storage area in management table 5, designates voice file numbers for each arbitrary unit of information from the information provider, notifies register 6 of these numbers and instructs production of each voice file.

When production of voice files is instructed from record/playback controller 4, register 6 records the plurality of voice information units sent by way of voice communication controller 2 into respective voice files of the designated numbers in recording medium 7.

Here, as shown in the example of information from the information provider presented in FIG. 2, "Here are today's bargains" is recorded into the voice file having voice file number "505"; "please designate" is recorded into the voice file having voice file number "510"; "100 for Article A" is recorded into the voice file having voice file number "550"; and "and 200 for Article B" is recorded into the voice file having voice file number "575."

According to instructions from the information provider, record/playback controller 4 then pairs index number "10" with voice file number "505," index number "12" with voice file number "510," index number "15" with voice file number "550," and index number "17" with voice file number "575" and records to storage area of information number "n" of management table 5.

When a telephone call is received from an information user, voice information service device 1 performs call acceptance at voice communication controller 2, and upon judging the call to be for playback service at service analyzer 3, receives designation of the information number from the information user and sends the designated information number to record/playback controller 4 to instruct playback.

Record/playback controller 4 searches the corresponding storage area within management table 5 based on the designated information number, and sends each voice file number to register 6 in the order of the index numbers. Register 6 accesses each of the voice files of recording medium 7 in the received order, registers their content, and plays back the information.

Taking as an example the case in which the information of information number "n" in FIG. 2 is played back, the content of voice files within the corresponding storage area is passed on to register 6 in the order of index number, and "Here are today's bargains. Please designate 100 for Article A and 200 for Article B" is provided to the information user as the requested information.

As described hereinabove, information is divided into arbitrary units and recorded, and as a result, information need not be entirely recorded again upon alteration of a portion or addition of information.

Accordingly, only modified portions or added portions need be recorded, thereby allowing a more efficient information service.

In addition, because each type of information need not be arranged by a system manager, information from information providers can be quickly updated, and information users can more quickly obtain the latest information.

In this embodiment, a case has been described in which voice file numbers designated by record/playback controller 4 are not returned to the information provider, but voice file numbers may be returned to the information provider, for example, by voice, after the information has been recorded.

In such a case, by designating the voice file number to the voice information service device, the information provider may use a single voice file in a variety of messages. For example, if the same information provider is providing a plurality of messages, the same voice file can be shared by a plurality of information numbers. Accordingly, even in cases in which differing information numbers must be provided because one portion of information differs or information is added, index numbers and voice file numbers for common information need merely be specified in the storage area of the necessary information number of management table 5, and this information need not be recorded, thereby enabling a more efficient information service.

Moreover, previously recorded information may be reused by maintaining the content of voice files without erasing for a set time interval according to the wishes of an information provider. In such a case, for playback, the index numbers and the voice file numbers may be designated in the storage area of the necessary information numbers of management table 5.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A voice information service device wherein voice information can be provided from a plurality of information providers using telephones, and a plurality of information users can receive provided voice information by telephone, comprising:

a voice communication controller that performs call acceptance of telephone calls from an information provider or information user and analyzes Push-Button (PB) tones to produce an analysis result;

a service analyzer that, based on said analysis result of said voice communication controller, decides to record or play back information;

a recording medium made up of a plurality of voice files into which information may be recorded;

a management table in which storage area is secured for every information number assigned to information, and into which, for every said information number, a voice file number for identifying said voice file and an index number for designating the order of playback of said voice files are recorded, said information being divided into arbitrary units according to designation by said information provider;

a record/playback controller that, when recording information, designates said voice file number, pairs the voice file number with an index number designated by said information provider and records to said storage area, and when playing back information, reads out said voice file number in the order of said index numbers from said storage area corresponding to said information number designated by the information user; and a register that, when recording information, records information for every arbitrary unit designated by said information provider to a voice file of voice file number designated by said record/playback controller, and when playing back information, registers and plays back information within voice files in the order of voice file numbers read out by said record/playback controller.

2. A voice information service device according to claim 1 wherein said record/playback controller returns to said information provider voice file numbers designated when recording information, and according to instructions from said information provider, pairs said index numbers and said voice file numbers and records said index numbers and said voice file numbers in pairs to said storage area.

3. A voice information service method utilizing a recording medium made up of a plurality of voice files into which information may be recorded and a management table which secures storage area for every information number assigned to information and, for each of said information numbers, records a voice file number for identifying said voice file and an index number for designating the order of playback of voice files; wherein voice information can be provided from a plurality of information providers using telephones and a plurality of information users can receive provided voice information by telephone, said information providers dividing said information into arbitrary units; and wherein:

call acceptance is performed for telephone calls from information providers or information users and Push-Button (PB) tones are analyzed to produce a PB analysis result, and, based on said PB analysis result, judgment is made to record or playback information;

when judgment is made to record information, said voice file number is designated, said voice file number and an index number designated by one of said plurality of information providers are paired and recorded to said storage area;

and in addition, information for every arbitrary unit designated by said information providers is recorded to a voice file of a designated voice file number;

and when judgment is made to play back information, said voice file numbers are read out in the order of said index numbers from a storage area corresponding to an information number designated by one of said information users; and information within voice files is registered and played back in the order of read voice file numbers.

4. A voice information service method according to claim 3 wherein voice file numbers designated when recording information are returned to one of said plurality of information providers, and according to instructions from said one of said plurality of information providers, said index numbers and voice file numbers are paired and recorded to said storage area.

* * * * *